United States Patent [19]
Saxton

[11] 3,754,436
[45] Aug. 28, 1973

[54] HARDNESS TESTING APPARATUS
[76] Inventor: Richard F. Saxton, 3270 Fairhill Dr., Rocky River, Ohio 44116
[22] Filed: Aug. 31, 1972
[21] Appl. No.: 285,380

[52] U.S. Cl. ................................................. 73/81
[51] Int. Cl. ........................................... G01n 3/42
[58] Field of Search ............................ 73/81, 82, 83

[56] References Cited
UNITED STATES PATENTS
2,491,667  12/1949  Kent ..................................... 73/81
2,713,259  7/1955  Grodzinski et al. ..................... 73/81
2,839,917  6/1958  Webster ................................. 73/81

*Primary Examiner*—Jerry W. Myracle
*Attorney*—James T. Hoffmann

[57] ABSTRACT

A hardness testing apparatus of the indenter type wherein the work is held against movement during indentation by a fluid-actuated indenter and subsequent measurement of the indentation by a laser-scanner-photoreader carried by the test head.

2 Claims, 2 Drawing Figures

HARDNESS TESTING APPARATUS

BACKGROUND OF THE INVENTION

1. Field of Invention

The invention relates to hardness testers of the indenter type.

2. Description of the Prior Art

Hardness testing apparatus of the indenter type are well known in the prior art as are different methods of measuring the indentations and calculating the hardness of the objects tested. Such operations normally require considerable time, often requiring transfer of the test object from one instrument to another, and the results are not of the highest accuracy.

SUMMARY OF THE INVENTION

The present invention provides a novel and improved high accuracy hardness testing apparatus of the indenter type in which the indentation made by the indenter is measured while the test article remains in the testing apparatus in the position it occupied upon termination of the indentation.

The invention further provides a novel and improved hardness testing apparatus of the character referred to having a laser-scanner-photoreader for measuring the indentation made by the indenter. In addition to utilizing the signal generated by the photoreader to give an indication of the size of the indentation and/or the hardness of the object tested, the signal may also be employed to perform some automatic operation such as, grading, marking, etc., either directly or by way of a single purpose computor.

Further objects and advantages of the hardness testing apparatus of the present invention will be apparent from the following description of and the accompanying drawings showing the preferred embodiment of the invention.

PREFERRED DESCRIPTION OF THE DRAWINGS

FIG. 1 is a front elevational view of a hardness testing apparatus embodying the present invention; and FIG. 2 is a vertical central section with portions in elevation through the testing unit shown in FIG. 1.

DESCRIPTION OF THE PREFERRED EMBODIMENT

Figure 1:
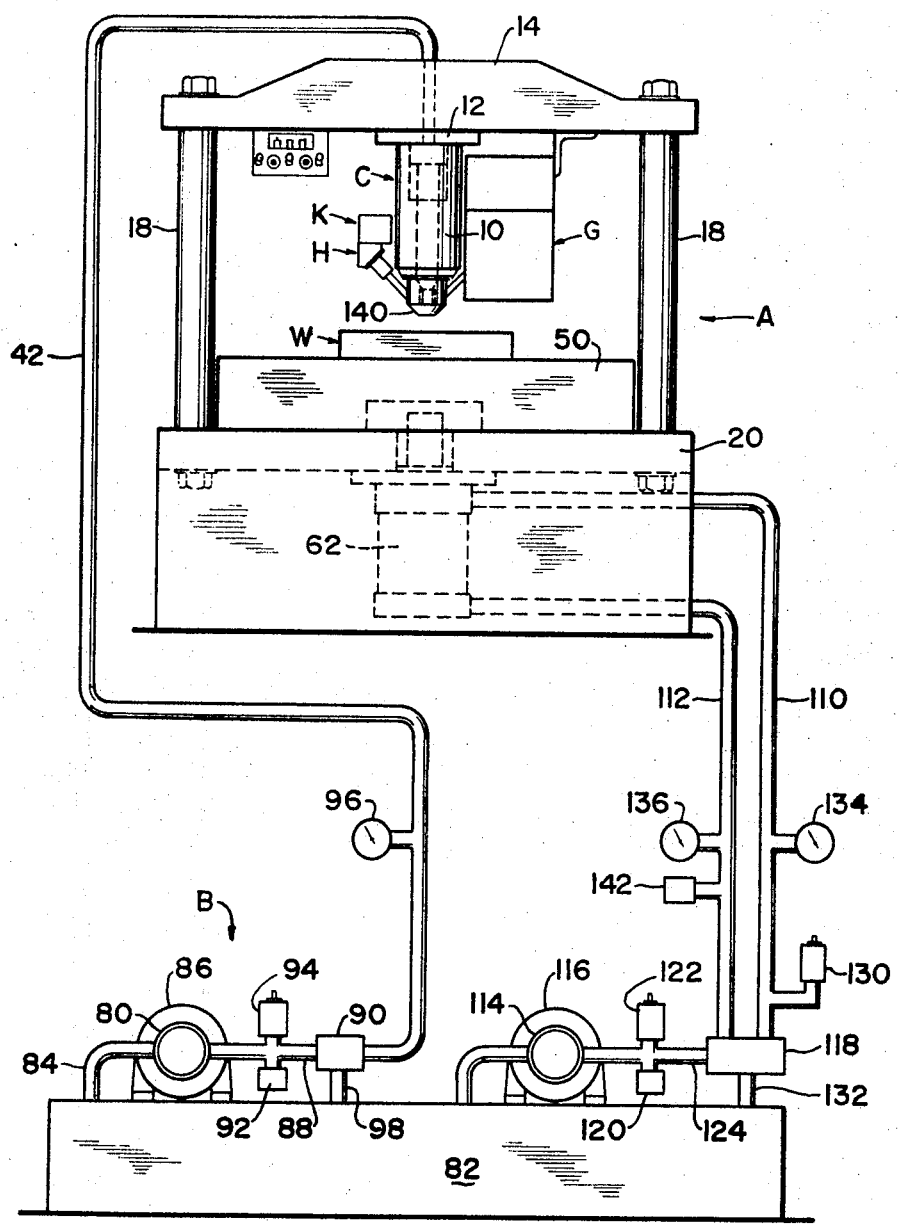
Figure 2:
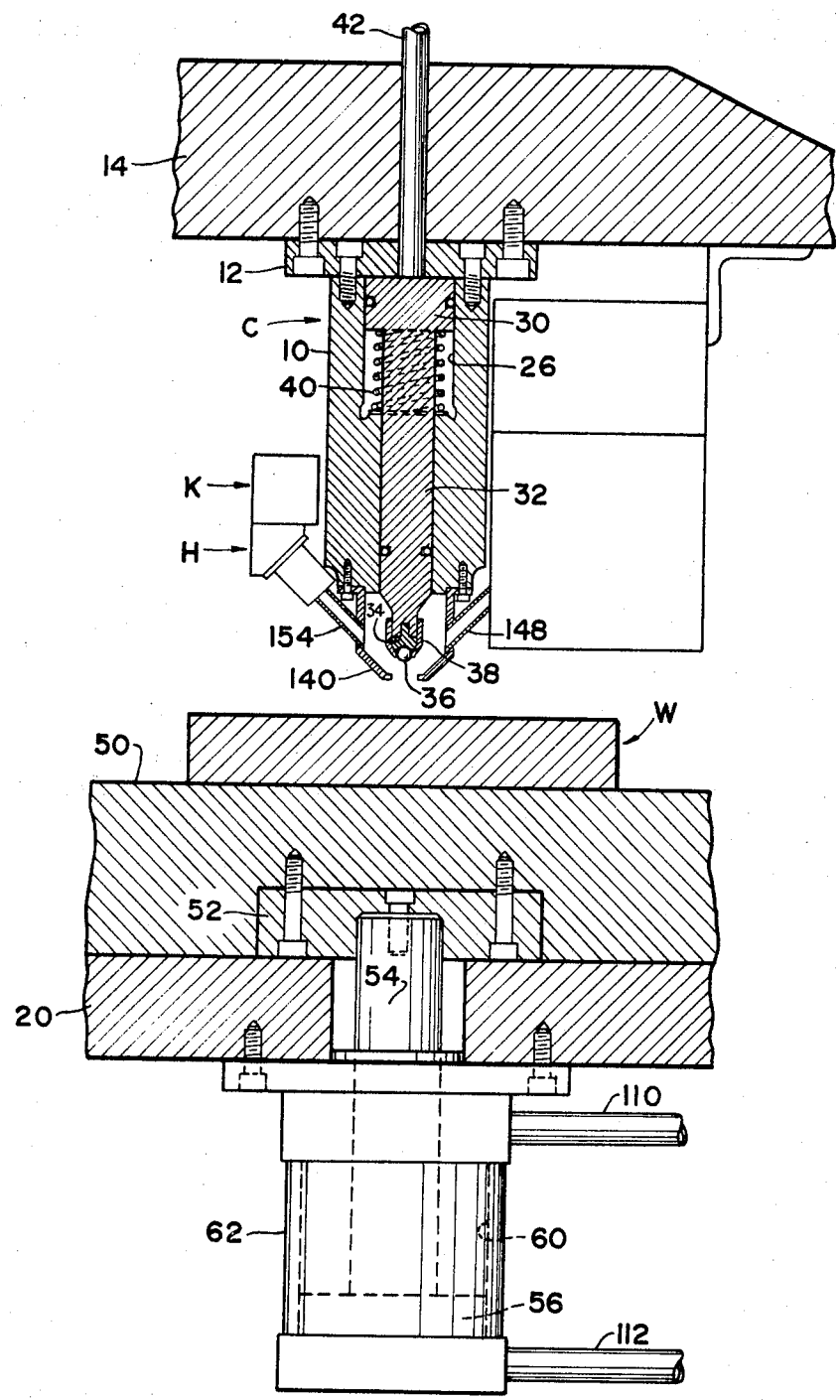

The hardness testing apparatus shown in the drawings comprises a testing unit, designated generally by the reference character A, and a power unit B. The testing unit A comprises a test head C including a vertically extending cylinder 10 having its upper end detachably bolted to a circular plate 12 which plate is in turn detachably bolted to an upper plate or platen 14 supported in spaced relation above a base 16 by columns 18. The platen or member 14 is detachably connected to the upper ends of the columns 18 and the lower ends of the columns detachably connected to a plate 20 forming part of the base 16.

The cylinder 10 is counterbored as at 26 from its upper end for the reception of a piston 30 slidable vertically therein and formed integral with the upper end of a piston rod or plunger 32 extending through the lower end or head of the cylinder 10. The lower end of the piston rod or plunger 30 is of reduced diameter and carries a member 34 providing on its lower end a semispherical seat against which an indenter, in the present embodiment a ball 36, is held by a chuck 38. The combination piston and plunger 30, 32 is spring-biased in an upward direction by a spring 40 interposed between the shoulder formed by the counterbore 26 in the upper end of the cylinder 10 and the underside of the piston head 30. The piston 30 and plunger 32 which with the cylinder 10 constitute a single action fluid-pressure motor are moved in a downwardly direction by hydraulic fluid under pressure supplied to the upper end of the cylinder 10 through a conduit 42. The piston 30 and the piston rod 32 are provided with customary O-ring seals to prevent the escape of fluid threreabout.

An article to be tested, such as the article W, is positioned on the upper side of a worktable 50 detachably connected to a circular member 52 which member is in turn detachably connected to the upper end of a vertically extending plunger 54 formed integral with a piston 56 slidably supported in a counterbore 60 in the lower end of a vertically extending cylinder 62 detachably connected to the underside of the plate 20 of the base 16. The plunger 54 and the piston 56 connected thereto and the cylinder 62 constitute a double acting, reciprocating-type fluid pressure motor and the combined plunger 54 and piston 56 are reciprocated in opposite directions in the cylinder 62 by the admission of fluid under pressure to the cylinder 62 at one side or the other of the piston 56, with the opposite side of the cylinder connected to the fluid sump.

The embodiment shown includes separate hydraulic systems for both the single-acting hydraulic motor for pressing the indenter into the workpiece and the double-acting hydraulic motor for raising and lowering the worktable. Hydraulic fluid under high pressure is supplied to the upper end of the cylinder 10 of the single-acting motor through the conduit 42 from a high pressure pump 80 connected to the sum 82 by a conduit 84 and driven by an electric motor 86. The pump 80 is connected by a conduit 88 to a solenoid-operated, two-way valve 90 which controls the flow of fluid to and from the cylinder 10. The conduit 84 connecting the pump 80 to the valve 90 has an accumulator 92 and an adjustable relief valve 94 connected thereto and a pressure gauge 96 is connected to the conduit 42. The valve 90 is connected to the sump 82 by a conduit 98.

Fluid is supplied to the double-acting motor to raise or lower the worktable 50 through conduits 110, 112 by a pump 114 driven by an electric motor 116 under the control of a solenoid operated, four-way valve 118. The system has an accumulator 120 and an adjustable relief valve 122 connected to the conduit 124 between the pump 114 and the valve 118. A second adjustable relief valve 130 is connected in the conduit 110 connecting valve 118 with the upper end of cylinder 62. The valve 130 is normally set at a lower pressure than valve 122 so as to provide fluid at a relatively low pressure for operating the double-acting motor in the direction to lower the worktable 10. The valve 118 is connected to the sump 82 by a conduit 132 and conduits 110, 112 have pressure gauges 134, 136 connected thereto, respectively.

The four-way valve 118 is normally in the position to supply fluid under low pressure through conduit 110 to the upper end of cylinder 62 to maintain the worktable 50 in its down position. An article W to be tested for hardness is placed upon the worktable 50 and upon a subsequent signal from a peddle-switch or some other suitable control the solenoid-actuated four-way valve 118 is operated to raise the table 50 by the admission of fluid under pressure to the lower end of cylinder 62 below the piston head 56, through conduit 112 until the test article engages the lower end of a feeler cone or clamping nose member 140 connected to the lower end of the cylinder 10 of the test head and extending below the indenter 36 when the indenter is in its normal raised position. As the article W contacts the clamping nose member 140 the accumulator 120 absorbs the hydraulic impact and controls the rate of pressure rise in the cylinder 62. The adjustable relief valve 122 controls the ultimate clamping pressure between the worktable 50 and the clamping nose member 140. The clamping pressure can be observed in the pressure gauge 136 connected to the conduit 112.

Upon the pressure in conduit 112 reaching a predetermined amount determined by an adjustable pressure switch 142, connected to the conduit 112, the valve 90 is operated to supply fluid under pressure to the conduit 42 and the upper end of cylinder 10 to lower the combination piston 30 and plunger 32 and press the indenter 36 against and into the workpiece with a predetermined pressure at which the pressure regulator 94 is set. The testing pressure can be observed on a pressure gauge 96 connected to conduit 42. After the expiration of a predetermined time which may be electrically controlled, if desired, the valve 90 is de-energized and the combination piston 30 and plunger 32 allowed to raise under the action of the spring 40 to its normal up position.

As soon as the indenter is moved from the indentation formed in the workpiece a laser beam is scanned across the indentation from a beam source G through a tube 148 extending into an opening in the one side of the cone nose or clamping member 140. The beam is deflected through an opening in the opposite side of the clamping member 140 and a tube 154 and to photoreader H at the opposite side of the test head from the beam source G. The photoreader will cause the exact numerical dimension of the diameter of the indentation formed by the indenter 36 to be displayed upon a digital reading volt meter K where it can be read by an operator. Alternatively, the signal output can be used to operate various signal or automatic sorting or controlling devices. The tubes 148, 154 at opposite sides of the nose cone 140 exclude incident light and increase the accuracy of the reading but can be omitted if desired. The laser beam source and scanner, designated generally as G, is commercially available and is not herein shown nor described in detail. The same is true of the photoreader H.

As an alternative to the use of the tubes 148, 154, the openings to which the tubes are connected could be closed by a red transparent member, for example, glass or plastic, which would transmit the laser beam but not incident light.

From the foregoing description of the preferred embodiment of the invention it will be apparent that the objects heretofore enumerated and others have been accomplished and that there has been provided a hardness testing apparatus of the indenter type in which the indentation is measured by a laser-scanner-photoreader while the test speciman is in the position with respect to the test head which it occupied at the termination of the formation of the indentation. The indenter plunger is reciprocable in the test head housing assembly and the laser beam generator and the photoscanner are fixed with respect thereto.

While the preferred embodiment of the invention has been illustrated and described in considerable detail, it is to be understood that the invention is not limited to the particular constructions shown and described, but it is the intention to hereby cover all adaptations, modifications and uses thereof which come within the practice of those skilled in the art to which the invention relates and the scope of the appended claims.

Having thus described my invention, what I claim is:

1. In a hardness testing apparatus: a worktable; a test head comprising a tubular member facing in the direction of said worktable and an indenter selectively projectable towards said worktable through said member; means for producing relative movement between said worktable and said member to clamp therebetween an article the hardness of which is to be tested; means for retracting said indenter from an article being tested while clamped between said member and said worktable; and a laser-scanner-photoreader fixed with respect to said member for measuring, while the article being tested remains clamped between said member and said worktable, an indentation made in the article by said indenter.

2. In a hardness testing apparatus: a worktable; a test head comprising a hydraulic cylinder having a reciprocable plunger therein and a tubular member facing in the direction of said worktable; an indenter carried by said plunger and selectively projectable towards said worktable through said member; means for reciprocating said worktable toward and away from said member to clamp and unclamp an article the hardness of which is to be tested against said member; means for reciprocating said indenter to and from an article being tested while clamped by said worktable against said member; and a laser-scanner-photoreader fixed with respect to said member for measuring while the article remains clamped between said worktable and said clamp member an indentation made in the article by said indenter.

* * * * *

PO-1050
(5/69)

UNITED STATES PATENT OFFICE
CERTIFICATE OF CORRECTION

Patent No. 3,754,436              Dated August 28, 1973

Inventor(s)  RICHARD E. SAXTON

It is certified that error appears in the above-identified patent and that said Letters Patent are hereby corrected as shown below:

The inventor's name was printed as Richard F. Saxton, whereas the correct name of the inventor is RICHARD E. SAXTON.

Signed and sealed this 12th day of February 1974.

(SEAL)
Attest:

EDWARD M. FLETCHER, JR.          C. MARSHALL DANN
Attesting Officer                Commissioner of Patents